(12) United States Patent
Haddock

(10) Patent No.: US 9,439,537 B2
(45) Date of Patent: Sep. 13, 2016

(54) FULLY AUTOMATED, TWIN-CHAMBER, CONTINUOUS HOT OIL FILTRATION SYSTEM

(76) Inventor: Gary Haddock, Mansfield, TX (US)

( * ) Notice: Subject to any disclaimer, the term of this patent is extended or adjusted under 35 U.S.C. 154(b) by 1123 days.

(21) Appl. No.: 13/269,975

(22) Filed: Oct. 10, 2011

(65) Prior Publication Data

US 2013/0087508 A1 Apr. 11, 2013

(51) Int. Cl.
*B01D 29/62* (2006.01)
*A47J 37/12* (2006.01)

(52) U.S. Cl.
CPC .................. *A47J 37/1223* (2013.01)

(58) Field of Classification Search
CPC .................................................. A47J 37/1123
See application file for complete search history.

(56) References Cited

U.S. PATENT DOCUMENTS

| 4,341,642 A * | 7/1982 | Koepke et al. ............... 210/767 |
| 5,597,601 A * | 1/1997 | Griffin .......................... 426/417 |
| 2004/0058043 A1* | 3/2004 | More .............................. 426/438 |

* cited by examiner

*Primary Examiner* — Peter Keyworth
(74) *Attorney, Agent, or Firm* — Norred Law, PLLC; Warren V. Norred

(57) ABSTRACT

An apparatus and process of continuous, filtration of cooking oil during food processing to reduce and control free-fatty-acids and undesirable coloration in the cooking oil, including the movement of oil from a vessel to a flat-bed pressure chamber, where the oil is filtered through a stainless steel mesh screen under pressure. Differential pressure in the chamber causes the system to run the oil to a sister filter chamber which takes over the filter function while the first chamber cleans its filter. The filters are cleaned by inducing a high pressure inert gas into the filter chamber that dries the sediment, and then a mechanical sweep removes the sediment to a waste container. The resulting alternating process of filtering and filter cleaning between two chambers is fully automated and provides filtering that considerably extends oil life.

3 Claims, 3 Drawing Sheets

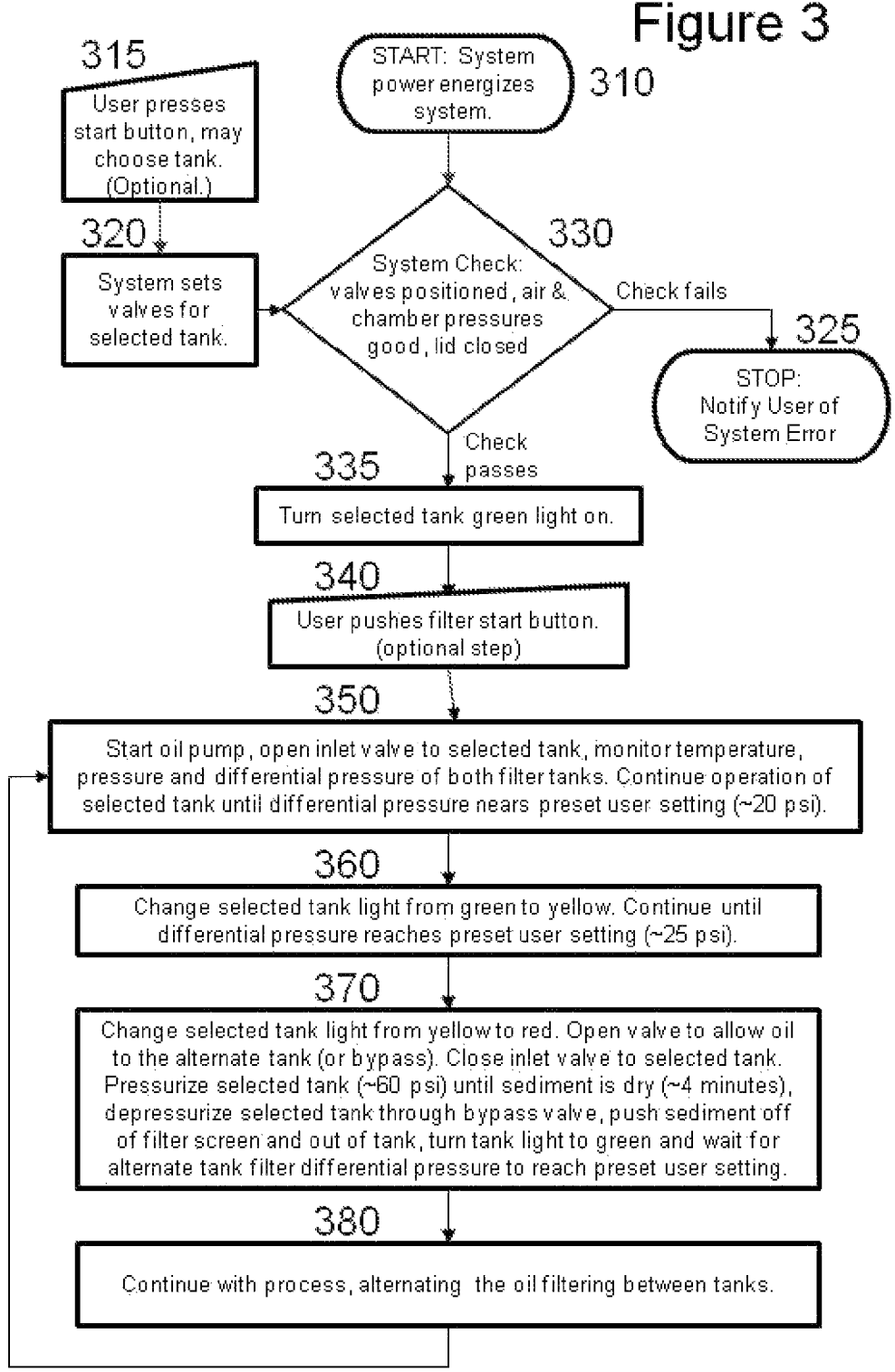

FULLY AUTOMATED, TWIN-CHAMBER, CONTINUOUS HOT OIL FILTRATION SYSTEM

CROSS-REFERENCE TO RELATED APPLICATIONS

Figure 1:
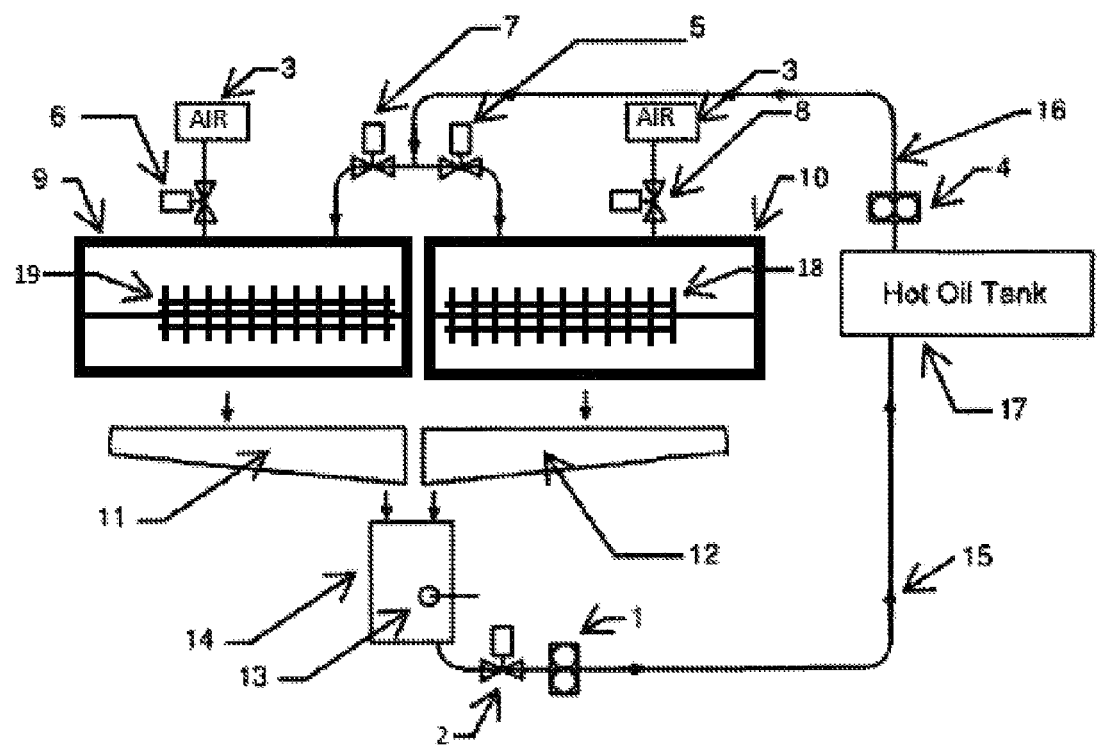

None.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF THE MATERIAL ON THE COMPACT DISC

None.

BACKGROUND OF THE INVENTION (1) Field of the Invention

The invention addresses the large-scale commercial installations of hot oil filtration systems used in food processing, particularly to continuous hot oil filtration in the fried foods industry, which includes but not limited to meat, poultry, fish, and chip industries.

(2) Description of the Related Art Including Information Disclosed Under 37 CFR 1.97 and 1.98

Food processing plants have a need for filtering hot oil that is used is batch fryers. As food is cooked in the fryers, the food throws off particulates. Sediments in the frying oil left in the oil caramelizes, raising the rancidity of the oil. After the rancidity of the oil reaches a predetermined level, the oil is considered un-usable and is discarded. Production line delays due to oil changes and filtering are expensive and cause wasted oil. This also causes the product quality to deteriorate based on taste, color, and texture. Commercial frying facilities must often devote a significant area and resources to the handling and processes of spent oil.

Typical systems minimize the cost of oil filtration and replacement by using a schedule convenient for production, from time to time, and swap out the old oil for new or cleaner oil, necessitating a pause in the production line. Other systems have a slow continuous filter that drains from the cooking vat (also known as a tank or chamber), filters the oil in some manner without any downtime, e.g., U.S. Pat. No. 3,581,896, U.S. Pat. No. 3,648,595.

Most of these approaches use a paper filter, or a chemical compound used in the cleaning process, requiring a constant expense and increased cost of disposal and sewage due to chemical elements in the filtering. Current techniques offer 8-30 gpm of filtering.

These existing approaches to filtering hot oil are insufficient for industry needs, as they either a) require downtime, b) require human intervention, c) require ongoing purchase of disposable filtering elements, and d) filter too slowly. The present invention eliminates these shortcomings.

BRIEF SUMMARY OF THE INVENTION

The invention is an automatic oil filtration system used in commercial food flyers that uses air pressure differential between the inlet and outlet of a filtering tank to control a continuous filtering process. In this technique, the oil is routed through one filter until it needs cleaning, and then routed through a second filter when the first filter needs cleaning. In this manner, the system is continuously in operation, with filters used in an alternating manner, used first to filter the oil, and then bypassed during cleaning stage. Because the oil is filtered by a metal screen in a pressurized tank, the filter can be cleaned by pressurized gas from the outlet side to clean a dirty filter.

One object of the invention is to provide a high volume cooking process for filtering hot oil, allowing no downtime in use of commercial fryers.

Another object is to provide a fully automated process for filtering hot oil, such that no human intervention is necessary.

Extend the useful life of cooking oil by preventing the formation of free fatty acids.

BRIEF DESCRIPTION OF THE SEVERAL VIEWS OF THE DRAWING(S)

FIG. 1—Hydraulic schematic of the invention with dual filter units.

Figure 2:
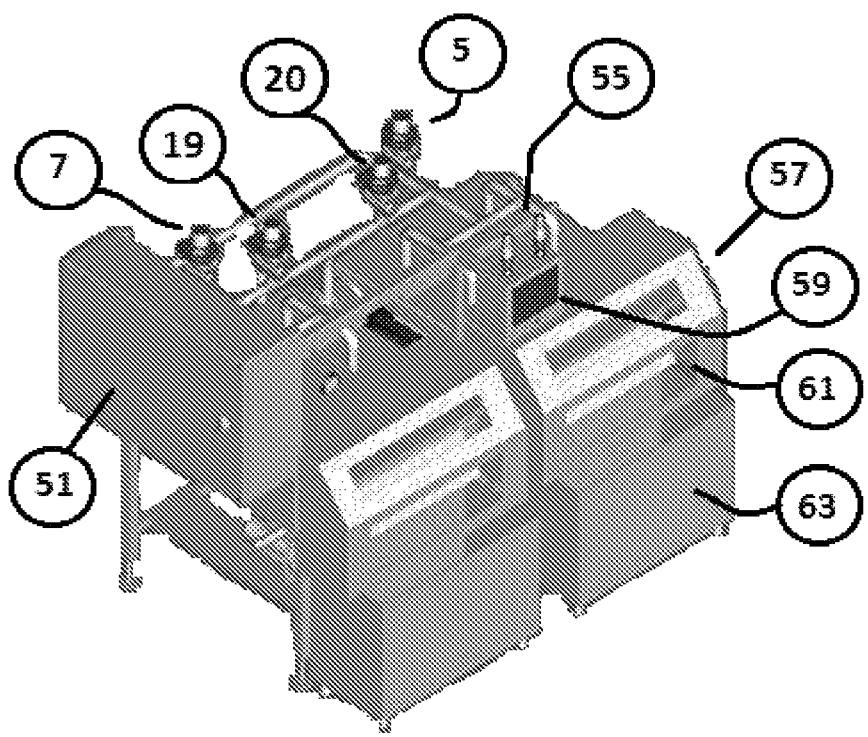

FIG. 2—Front elevation view of the invention with dual filter units.

FIG. 3—Control Scheme of the invention.

DETAILED DESCRIPTION OF THE INVENTION

According to the present invention, the foregoing objects and other advantages are attainted by an automated, twin chamber, continuous hot oil filtration system that uses pressured gas to push hot oil through a filter, and then employs pressure from the output side to clean the filter when the differential pressure exceeds a set limit. The oil is first routed through one filter until the filter requires cleaning, when the oil is rerouted to a second filter while the first is cleansed.

As shown in FIG. 1, the invention operates by using a supply pump 4 to move sediment-saturated oil from a hot oil tank 17 through the right chamber 10, routed by valve 5. The supply pump 4 provides sufficient pressure to drive the oil through a stainless steel screen filter 18 onto a drip pan 12, leaving the sediment on the screen filter 18. The drip pans collect the newly filtered oil into a receiver tank 14, which is pumped back to the hot oil tank 17 through return line 15 by return pump 1 when return valve 2 is opened.

As the oil is continuously pushed through the screen, sediment in the screen slowly clogs the screen filter 18, creating a differential pressure between the pressure chamber and the unpressurized drip pan 12. When the differential pressure reaches a preset point, valve 5 is closed and valve 7 is opened to allow hot oil into the left chamber 9, left screen filter 19, and the filtered oil to collect on left drip pan 11.

While the left side is performing the filtering function, the right screen filter 18 is cleaned by pressurization of the right chamber 10 by an inert gas (typically air or nitrogen) which enters the chamber 10 by air valve 8. The air pressure dries out the sediment after a user-defined period of time. After the sediment is dried, air valve 8 is closed, and the right chamber 10 depressurizes through the drip pan side of the right screen 18, and a mechanical ram or sweep pushes the sediment out of the chamber and into a refuse container.

The cycle explained above then repeats on the left side and then back to the right, each chamber alternating between the filtering function and the filter cleaning.

In the current rendition of the invention, the inventor uses a 60-150 mesh screen for filtering into the clean holding tank, a user-setting of 25-55 psi differential pressure between the two sides of the filter 18, and a user setting of 20-60 psi to the outlet side during the filter drying for a typical time period of four minutes before the sediment is swept off of the screen filter.

FIG. 2 is a perspective view of the invention as it is currently constructed. The unit is typically used in a dual-chamber construction, using two filter chambers which alternate filtering the hot oil and cleaning the filter. An electrical enclosure 51 sits on one side of the device, and provides all power and contains all control circuitry for the apparatus. Operators use an LCD touch screen 59 to interact with the device. A stack of colored lights 59 sit on the top of the device, providing indication of the tank conditions, green for filtering, yellow to indicate that the unit will need to clean its filter soon, and red to denote that the chamber is in the filter-cleaning process. Operators can watch the filtering process through an observation window in a lid 61 that covers the tank, and through which filtered sediment is disposed into a waste container 63 that sits in front of the device. The two valves 5, 7 that control which chamber receives the hot oil from the cooker and the gas which dries the sediment can be seen on the top of the chambers. In this picture of one installed and operational embodiment, optional bypass valves 19 and 20 are installed, which release pressure on the chambers as a safety precaution if the chamber pressure increases past a preset set point.

FIG. 3 describes the user-interface and control scheme of the invention, as follows:

- 310—When the system is energized, the system begins to monitor user input, waiting for a user to choose a tank.
- 315—User presses a start button or by some similar operation chooses a tank. This step is optional, as the system could set a default start tank, or choose randomly.
- 320—The processor sets the valves appropriately for the tank chosen, opening the air valve to allow oil into the selected tank and closing the valve to the unselected tank.
- 330—The processor checks sensors which provide indication of valve position, checks tank pressures and ensures that the tank lids are closed.
- 325—If the system check fails, the system alerts the user and prevents further operation.
- 335—When a system check passes, the green light above the selected tank is turned on. (The green light is one of three lights located together, installed on the top of an LCD screen used for user-interface. One set of three lights is installed for each tank. See FIG. 2, item 55.)
- 340—The system may commence immediately, or optionally, the system can be set up to wait on the user before continuing to start the filtering process by pressing a button on the control panel.
- 350—The system begins filtering by opening the inlet valve to the selected tank and starting the supply pump. In FIG. 1, this would be either inlet valve 5 or 7, and supply pump 4. The device operates in this status until the filter begins to be clogged by sediment, and the chamber pressure rises to a present level that warns an operator that the system will need to switch filter tanks soon. This differential pressure setting is typically at approximately 20 psi.
- 360—At the preset differential pressure, the filtering tank light color changes to yellow. The filter operation continues until the filter tank differential pressure reaches 25 psi.
- 370—At 25 psi, the filter tank light color is changed to red. The control system opens the inlet valve to allow oil to the alternate tank, closes the inlet valve to selected tank, pressurizes the selected tank that was previously handling the filter process with an inert gas, typically air or nitrogen, at a pressure sufficient to force all the oil out of the sediment in a reasonable amount of time, typically four minutes at 60 psi. Then the tank depressurizes, and a mechanical sweep pushes sediment off of filter screen 18 and out of the tank. The tank light is turned to green, and the tank chamber sits in a waiting status until the other tank filter requires cleaning.
- 380—The process continues in this way, alternating filter chambers, one processing the hot oil, while the other chamber cleans its filter and awaits its turn to participate.

The systems described herein and on the drawings disclose details for a two-chamber system, but the same approach could be used to have three or more chambers to increase sediment capacity, or could be reduced to a one-chamber system that simply recirculates the hot oil while the filter is cleansed.

This specification has been described using the apparatus as configured in practice by the inventor, but there are many variations that can be made that remain within the spirit of the invention. The present invention should only be limited by the claims and their legal equivalents.

The invention claimed is:

1. A method of continuous, active filtration of cooking oil during food processing to reduce and control free-fatty-acid levels and undesirable coloration in the cooking oil, including:
   a. pumping oil from a cooking vessel through a first routing path comprising a first flat-bed pressure chamber, a first mesh filter screen, a first drip pan, and a receiver tank;
   b. straining the oil through the first mesh filter screen into the first drip pan which collects the oil into a receiver tank;
   c. diverting the flow of oil when the first mesh filter screen requires cleaning to a second routing path comprising a second flat-bed pressure chamber, a second mesh filter screen, a second drip pan, and said receiver tank;
   d. cleaning the first mesh filter screen by a cleaning process comprising:
      i. pressurizing the first flat-bed pressure chamber with an inert gas which dries sediment on the first mesh filter screen,
      ii. sweeping sediment from the first mesh filter screen, and
      iii. expunging the first flat-bed pressure chamber of sediment into a waste container;
   e. continuing to route the oil through the second routing path until the second mesh filter screen requires cleaning;
   f. rerouting the oil through the first routing path;
   g. cleaning the second mesh filter screen using the previously described cleaning process while the oil circulates through the first routing path;
   h. repeating the process described in the previous steps, alternating the oil flow between the first routing path and the second routing path, such that the first mesh filter screen is cleaned when the oil is diverted from the first routing path to the second routing path, and the second mesh filter screen is cleaned when the oil is diverted from the second routing path to the first routing path.

2. The method of claim 1 further including the step of venting pressure from the first and second flat-bed pressure chambers to atmosphere during the described cleaning process after the first and second pressure chamber has dried the sediment on its respective first mesh filter screen or second mesh filter screen, and before sweeping sediment from the respective first mesh filter screen or second mesh filter screen.

3. The method of claim 1 in which an automated air ram is used to sweep the sediment mass from each mesh filter screen into the waste container during the described cleaning stage.

\* \* \* \* \*